Feb. 28, 1956     S. DUFF     2,736,291
PIGGERIES AND SEWAGE DRAINAGE SYSTEMS THEREFOR
Filed Dec. 17, 1952
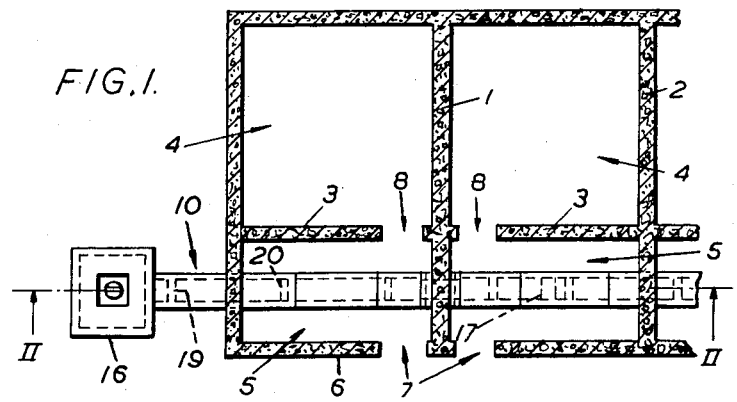
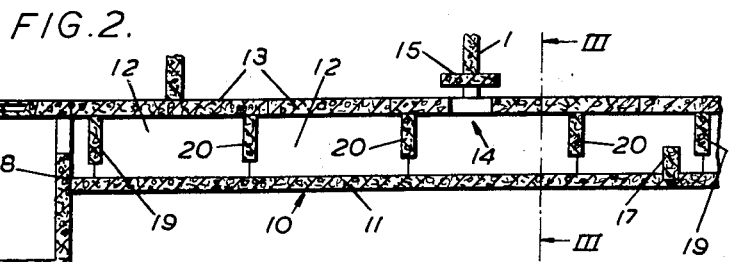
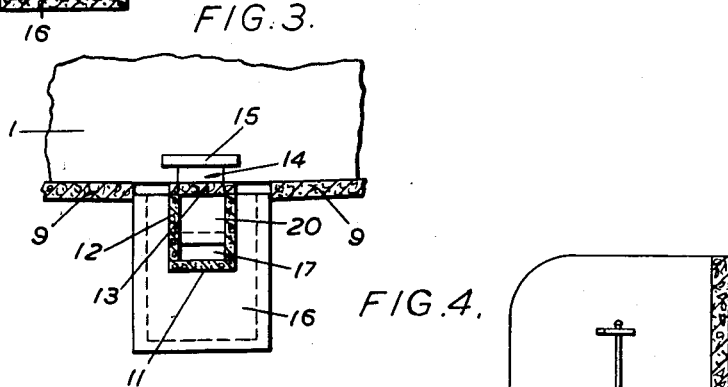
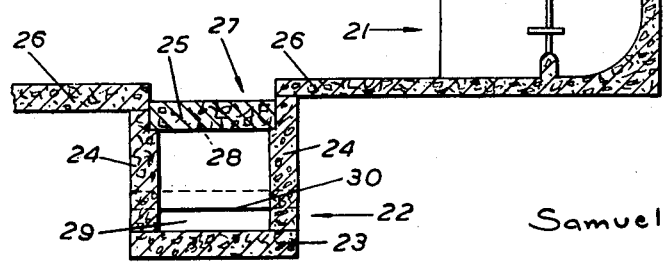
Samuel Duff
Inventor
By Richardson, David and Norden
his Attorneys.

United States Patent Office 2,736,291
Patented Feb. 28, 1956

2,736,291

PIGGERIES AND SEWAGE DRAINAGE SYSTEMS THEREFOR

Samuel Duff, Killaughy, Donaghadee, Northern Ireland

Application December 17, 1952, Serial No. 326,539

Claims priority, application Great Britain December 31, 1951

10 Claims. (Cl. 119—16)

This invention relates to pig-houses and the like, and drainage or the like systems therefor.

It will be understood that the excreta of pigs and cows forms a valuable manure and that it is desirable to collect same for this purpose. At present, the liquid excreta is either run into tanks or is allowed to run to waste, and the solid excreta is collected manually or is washed out with water. In the latter case, the excreta is either run to waste or is collected in its diluted form which has, of course, become weakened by the addition of water and also is of greater bulk requiring increased storage and transport space with resultant increase in costs.

An object of the present invention is to provide an improved drainage or the like system by which solid and liquid excreta may be collected together from a pig house or the like for use as manure, and which enables the house to be cleaned in a simple and convenient manner, with the minimum of labour and waste.

According to the present invention I provide for use in association with a pig-house or the like, a drainage or the like system for excreta, said system comprising conduit means located at a lower level than the floor of the house and leading to a sump, and outlet means in the floor of the house through which liquid excreta may drain and solid excreta may be swept into the conduit means, said conduit means incorporating baffle means adapted to retard the flow of liquid excreta through the conduit means so that the solid and liquid excreta may become well mixed before passing to the sump.

Embodiments of the invention will now be described by way of example, with reference to the accompanying drawing, in which:

Fig. 1 is a fragmentary sectional plan view of a pig-house incorporating the drainage system according to the invention, Fig. 2 is a fragmentarcy sectional view on the line II—II of Fig. 1, and to an enlarged scale, Fig. 3 is a sectional view on the line III—III of Fig. 2, and Fig. 4 is a sectional end view of a cow-house or byre incorporating a drainage system according to the invention.

Referring to Figs. 1 to 3 of the drawing, the pig-house is, in known manner, divided by partition walls 1, 2 into a series of side-by-side compartments or sties, one for each batch of pigs. Each compartment is subdivided by a wall 3 so as to provide a portion 4, hereinafter called the bed, in which the pigs are housed, and a portion 5, hereinafter called the yard, in which the pigs excrete. The outer wall 6 is provided with gaps 7 to allow the pigs to enter, and the partition walls 3 have gaps 8 to allow the pigs to pass between the yards 4 and the beds 5.

Each yard 5 has a concrete floor 9, Fig. 3, and the drainage system extends from one end of the pig-house to the other and below the floor of the yards 5. The drainage system consists of a conduit generally indicated at 10 and of substantially U-shaped cross section. The base 11 of the conduit is formed of concrete, and its side walls of concrete slabs 12 and the conduit is closed from above by further concrete slabs 13 which lie flush with the floor 9.

At every second dividing wall 1, an outlet aperture 14 is provided in the top wall of the conduit. Each aperture 14 extends for a short distance on each side of the wall 1 into the two adjacent yards 5, and the wall 1 at that portion terminates a short distance above the aperture 14 as shown best in Figs. 2 and 3. The walls 1 are provided with flanges 15 which are spaced above the apertures 14 to prevent the pigs accidentally placing their feet in the apertures 14. The arrangement is such that liquid excreta drains into the apertures 14 and solid excreta can be swept into same so as to drop into the conduit 10. The floor 11 of the conduit is sloped slightly downwards towards its sump end, the sump being indicated at 16. The conduit 10 is divided into a series of compartments or troughs by means of interspaced lower baffles 17 which extend fully across the conduit and extend vertically about half-way up the conduit from its base 11 and an extension of the wall of the sump at 18 forms a similar baffle which is the last in the direction of flow. Each compartment of trough is located below an outlet aperture 14, so that the excreta passed through each aperture drops into separate compartments or troughs. Additional apertures may, of course, be provided or one aperture may serve more than one compartment. Each compartment is also provided with an upper baffle 19 which extends fully across the conduit 10 and extends vertically downwards from the top wall thereof to near the base 11 of the conduit 10. Each of the baffles 19 is spaced a short distance away from its adjacent lower baffle 17 or 18 in the direction away from the sump 16.

In use, the liquid excreta flows or drains through the apertures 14 into the compartments therebelow, and the solid excreta is periodically swept into same. Both the solid and liquid are thus trapped in the compartments until they overflow from one to the other between the upper baffles 19 and the base 10 and over the lower baffles 17 and finally over the baffle 18 into the sump 16.

In use, both the liquid and solid excreta are trapped together in each compartment of the conduit until they overflow from one compartment into the other and finally into the sump. It has been found that, as the solid and liquid excreta lie together in the compartments, the solid excreta becomes broken up and forms a suspension with the liquid excreta and this process is aided by the movement of the mixture as it passes over and under the baffles along the conduit 10. As aforesaid, the semiliquid mixture so formed passes to the sump 16, from which it can be drawn off for use or for storage.

Additional or subsidiary upper baffles 20 are preferably provided in each compartment, as shown, to assist the first mentioned baffles, and if desired, the baffles may be depth adjustable so that the rate of flow may be increased or decreased at will. Water may, of course, be added to increase the state of liquification of the mixture, if required.

The invention will now be described with reference to Fig. 4 which shows a cross sectional end view of a cow-house or byre incorporating a drainage system according to the invention.

The byre consists of a series of side-by-side stands, of which only one is shown and is indicated generally at 21, in which the cows stand. The drainage system is similar to that above described with reference to Figs. 1 to 3, the conduit being indicated generally at 22, its base at 23, the slabs of its side walls at 24, and the top slabs at 25. The floor of the byre is indicated at 26 and the said top slabs 25 are sunk relative to the floor so as to form a channel 27 into which excreta from the cow falls. The channel is provided at intervals with apertures 28 through which the liquid excreta drains into the conduit and through which the solid matter is swept from time to time. The apertures may be of any convenient shape and may be located in any convenient position in the channel 27, and may, if necessary, be covered from above in a manner similar to the apertures 14 in Figs. 1 to 3. The arrangement of baffles corresponds to that in Figs. 1 to 3, and the baffles corresponding to the baffles 17 and 19 in said figure are indicated respectively at 29 and 30. In Fig. 4, the sump is not shown. The channel 27 is located so that most of the excreta falls into same from the cows, but some may of course, fall on the floor 26 of the stand 21. The floor 21 is therefore bedded with chopped straw, sawdust or like material which, if it did become mixed with the excreta, would not block the conduit 22.

The invention is preferably applied to large unitary pig-houses as above described, but may equally well be applied in a similar manner to a number of smaller pig-houses. In this case, each house has its own drainage compartment with baffles, and each compartment is provided with a sump or is connected by conduit to a common sump.

The baffles may be secured in position in any convenient manner, and may be supported, for example, in recesses formed between or in the slabs forming the side walls of the conduit.

It is to be understood that various modifications may be made without departing from the scope of the invention, and that the invention is also applicable to other animal, bird or fowl houses, modifications being made, as necessary.

As a result of the invention there is provided an easily constructed drainage system in which both liquid and solid excreta may be collected and which enables the house to be kept clean in a time and labour saving manner and so that the solid and liquid form a rich mixture before passing to the sump from which it may be pumped or otherwise removed for use as manure. Also, as the solid excreta can be swept into the system, instead of having to be washed in, the full strength of the manure is maintained, though some water may be added under control, if desired.

I claim:

1. For use in association with a pig-house or the like, a drainage or the like system for excreta, said system comprising conduit means located at a lower level than the floor of the house and leading to a sump, and outlet means in the floor of the house through which liquid excreta may drain and solid excreta may be swept into the conduit means, said conduit means incorporating baffle means adapted to retard the flow of liquid excreta through the conduit means so that the solid and liquid excreta may become mixed before passing to the sump.

2. A drainage system according to claim 1, in which the system consists of a conduit extending from end to end of the house and below the floor of same and leading at one end to a sump.

3. A drainage system according to claim 2, in which said baffle means comprises a plurality of baffle members extending across the conduit and extending for a short distance upwardly from the base of the conduit, so as to divide the conduit into a plurality of compartments or troughs in which the liquid and solid excreta are trapped together until they overflow from one to another into the sump.

4. A drainage system according to claim 3, in which said baffle means comprises further baffle members each spaced a short distance from the upwardly extending baffle members in the direction away from the sump, each of said further baffle members extending across the conduit and downwardly to within a short distance of the base, so that both solid and liquid excreta must pass below said further baffle members, thus assisting the inter-mixing of the solid and liquid excreta.

5. A drainage system according to claim 4, in which a number of further downwardly extending baffle members are located in each compartment so as to assist the mixing of the solid and liquid excreta further.

6. A drainage system according to claim 2, in which the conduit is formed with a concrete base and top and side walls formed by concrete slabs.

7. A drainage system according to claim 6, in which said outlet means comprises a plurality of interspaced through-apertures in the top wall of the conduit.

8. A drainage system according to claim 7 and for a pig-house formed by a series of side-by-side sties, in which the said apertures extend for a short distance on each side of every second partition wall of the house and are protected from above by flanges provided on said partition walls.

9. A drainage system according to claim 7 and for a cow-house, in which the top wall of the conduit is sunk relative to the floor of the house so as to form a channel and the conduit is located so that excreta from cows at their stands in the house may fall into the channel, and the said top wall having apertures through which excreta may drain or be swept into the conduit.

10. In combination, a pig-house and drainage system for excreta, said system comprising a sump, a channel shaped conduit extending below the floor of the pig-house and leading to said sump, an upper wall closing the conduit from above and forming a portion of the floor of the house, and outlet means in said upper wall leading from the pig-house to the conduit, and in said conduit a plurality of upper and lower baffles, the lower baffles extending for a short distance upwardly from the base of the conduit so as to divide the conduit lengthwise into a series of compartments and the upper baffles extending downwardly from the said upper wall in overlapping relationship with the lower baffles and being spaced from the base of the conduit, whereby liquid excreta and solid excreta may respectively drain or be swept from the pig-house through said outlet means into the conduit and be trapped together in said compartments so that the liquid and solid excreta become intermixed before finally passing to the sump as a rich undiluted mixture, the said upper baffles assisting intermixing by virtue of the fact that they prevent the liquid excreta running off the top of the solid excreta which is the heavier so that the liquid in endeavouring to pass below the upper baffles becomes mixed with the solid and in effect acts as a carrier for the solid.

References Cited in the file of this patent

UNITED STATES PATENTS

| 123,663 | Anderson | Feb. 13, 1872 |
| 836,386 | Keegan | Nov. 20, 1906 |
| 1,394,780 | Nicholas | Oct. 25, 1921 |
| 2,603,304 | Carrier | July 15, 1952 |

FOREIGN PATENTS

| 443,505 | Germany | Apr. 30, 1927 |
| 512,080 | Germany | Nov. 6, 1930 |
| 520,329 | Germany | Mar. 10, 1931 |